June 2, 1953 — M. SHAPIRO — 2,640,388
VIEWER FOR CAMERAS
Filed Nov. 14, 1951

INVENTOR.
Mitchell Shapiro
BY James G. Bethell
ATTORNEY.

Patented June 2, 1953

2,640,388

UNITED STATES PATENT OFFICE 2,640,388

VIEWER FOR CAMERAS

Mitchell Shapiro, Pittsfield, Mass.

Application November 14, 1951, Serial No. 256,248

1 Claim. (Cl. 88—1.5)

My invention relates to an improved viewer hood for reflex cameras and provides a construction whereby the image may be viewed in the usual inverted position or erect, as desired.

A further object of the invention is to provide a viewer hood in which, when the camera is in conventional position, the image will be inverted, but when held at eye level, the image will be erect.

A still further object of my invention is to provide a viewer of such construction that it may be applied readily to existing cameras of the reflex type.

My viewer is relatively simple and compact in construction and requires no special skill for operation.

In the accompanying drawings, wherein I have illustrated an embodiment of my invention, Fig. 1 is a rear elevational view of my improved viewer hood;

Figure 1:
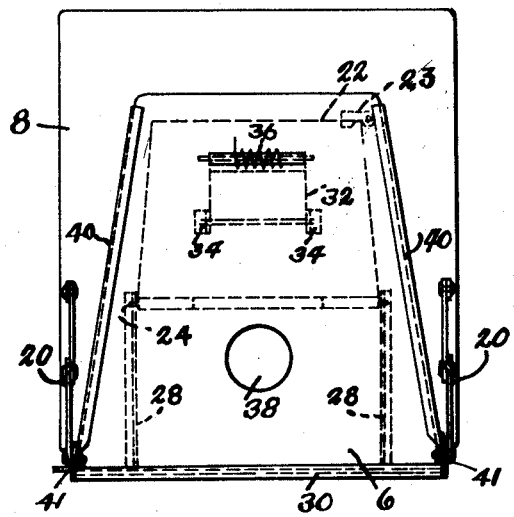

For the sake of clarity of description and illustration I have omitted the showing of a camera other than to show the top plate 2 of a reflex camera, to which my viewer is attached, and the usual image-receiving ground glass 4, upon which the image to be viewed is imposed by the camera lens in conventional fashion.

The viewer hood comprises a rear flap 6, hinged at 7 to the top plate 2 of the camera across the rear of the camera. 8 designates a front flap or lid, which is hinged at 9 to the top plate 2 across the front of the camera, while side flaps 10 are hinged at 11 to the two side edges of the front flap.

The front flap or lid 8 also carries a top flap 12 on its rear face, the spring hinge therefor being designated 14.

Mounted on the rear or inner face of the front flap or lid 8, below the flap 12, is a mirror 16.

Figure 2:
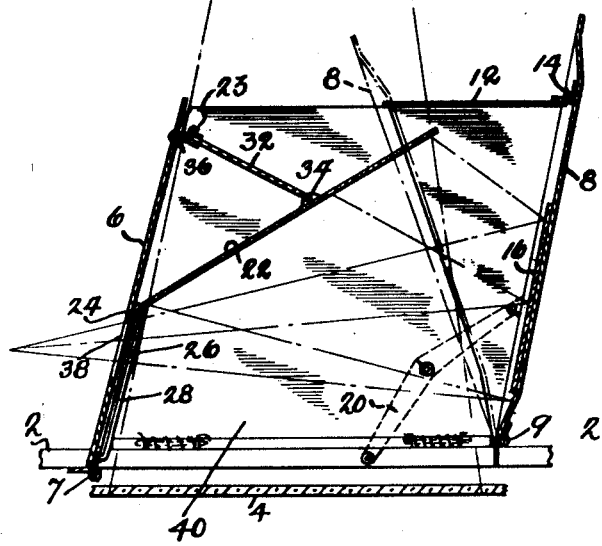
Fig. 2 is a side view of the hood in part section.

The front flap 8 is maintained in raised position, as seen in Fig. 2, by a pair of toggles 20, one at each edge of the flap. This permits the front flap to be folded down upon the camera top when the hood is not in use.

In addition to the mirror 16, my hood comprises another mirror 22, to the lower edge of which I affix a rod 24. The ends of this rod ride in a slot 26 in each of a pair of foldable struts 28, which are on the hinge 7 of the rear flap 6, so that, when the rear flap is folded down upon the camera top, the struts 28 will be folded down also.

Intermediate the upper and lower ends of the mirror 22, I provide a supporting plate 32, extending transversely of the mirror back, the inner edge of which plate is hinged to the mirror at 34, while the outer edge of this plate is spring-hinged to the inner face of the rear flap, as indicated at 36. This arrangement permits the mirror 22 to be swung from the position shown in Fig. 2 to a position where it lies flat against the inner face of the rear flap 6, the ends of the rod 24 at the lower edge of the mirror moving downwardly into the slots 26 of the struts 28.

When the hood is used at eye level, the parts are in full-line position of Fig. 2. The rear flap 6 is provided with a peep hole 38, and at eye level the image is picked up by the mirror 22 from the ground glass 4, reflected from this mirror to second mirror 16, and from thence projected to the eye of the observer through the peep hole 38. It will be apparent that, by reason of this construction, the image as seen by the observer is erect and not inverted. Under these conditions, the side flaps 10 are in their open or extended position, as illustrated; also, another pair of side flaps 40, hinged at 41, are in open or extended position, so that light is effectively excluded from entering the hood at the sides thereof by the two sets or pairs of side flaps.

When the hood is being used in conventional fashion, that is, below eye level, the side flaps 10 and lid 12 are folded, as shown in Fig. 2. The flaps 40, however, are still left erect, and the front flap 8 is moved to the broken-line position shown in Fig. 2, the mirror 22 and its supporting plate 32 being folded back against the inner face of the rear flap 6, the mirror being retained in this position by the catch or latch 23.

Figure 3:
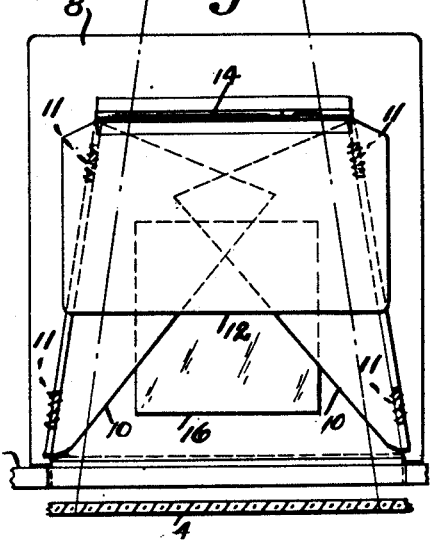
Fig. 3 is a view taken at the inner face of the front flap or lid.

To collapse the hood, it is merely necessary to swing the mirror 22 and its supporting plate 32 flat against the inner face of the rear flap 6 and to fold over the side flaps 40, whereupon the rear flap, the mirror 22, and the struts 28 may be closed down upon the camera top. The lid or top flap 12 is then swung toward the inner face of the front flap 8, causing the side flaps 10 to swing inwardly, so that these side flaps and the lid 12 will then be in the position shown in Fig. 3, with the lid or top flap 12 overlying the side flaps. By breaking the toggles 20, the front flap or cover flap may then be collapsed, carrying with it the top flap 12, side flaps 10, and mirror 16, so that the hood is entirely closed.

With the hood closed, it will be understood that the front flap 8 will overlie the top flap 12, the side flaps 10, and the rear flap 6, in the order mentioned.

The hinges for the top flap 12, side flaps 10, and the rear flap 6 are spring hinges, so that, in order to raise these elements to open-hood position, it is merely necessary to raise the front flap 8.

It is to be understood that changes may be made in the details of construction and arrangement of parts within the purview of my invention.

What I claim as my invention is:

A viewing hood for reflex cameras comprising, in combination, front, rear, and side flaps, the front and rear flaps being hinged at their lower edges; a top flap hinged to the front flap and, when extended, overlying the upper edges of the side flaps, whereby, by collapsing the top flap upon the front flap, the side flaps will be swung to collapsed or closed position; toggle mechanism normally to hold the front flap in erect position; a mirror attached intermediate its ends to the rear flap; struts at the lower edge of the mirror on the rear flap hinge; a rod extending transversely of the mirror adjacent its lower edge; longitudinal slots in said struts engaged by said rod, whereby said mirror can be swung to a position whereby it extends at an angle to the plane of the rear flap or retracted so as to lie flush with the face of the rear flap; a second mirror carried by the front flap for cooperation with the first flap; spring hinges for holding the rear flap and side flaps erect or extended; and toggles for holding the front flap in erect or extended position.

MITCHELL SHAPIRO.

References Cited in the file of this patent

UNITED STATES PATENTS

| Number | Name | Date |
|---|---|---|
| 2,323,005 | Bertele | June 29, 1943 |
| 2,500,058 | Brundage | Mar. 7, 1950 |

FOREIGN PATENTS

| Number | Country | Date |
|---|---|---|
| 399,853 | France | Mar. 7, 1909 |
| 447,742 | Great Britain | Aug. 23, 1934 |
| 656,817 | Germany | Feb. 15, 1938 |
| 675,275 | Germany | May 4, 1939 |
| 936,294 | France | Mar. 21, 1951 |